Patented July 9, 1935

2,007,429

UNITED STATES PATENT OFFICE 2,007,429

PROCESS FOR MAKING NEUTRAL CALCIUM HYPOCHLORITE WHICH CAN BE SATISFACTORILY FILTERED

Heinrich Klopstock, Aussig-on-the-Elbe, and Alfred Wurbs, Bokau, Czechoslovakia

No Drawing. Application July 31, 1933, Serial No. 683,094. In Germany August 4, 1932

7 Claims. (Cl. 23—86)

This invention relates to a substantial improvement in the production of neutral calcium hypochlorite by the chlorination of calcium hydroxide or of basic calcium hydrochlorites in the presence of solutions containing calcium chloride.

In the processes heretofore known, this chlorination is carried out in the presence of comparatively small quantities of liquid.

Limiting the addition of water in the chlorination as much as possible and, for example, commencing with a lime suspension which, for example, contains at most two parts of water to each part of calcium oxide, was recommended as being particularly advantageous. Only sufficient water should be present to keep in solution the calcium chloride which is formed in the course of the chlorination, so that the solid phase consisting of calcium hypochlorite is not contaminated with calcium chloride separated out with the same.

The technical execution of this process, however, was jeopardized by the fact that the calcium hypochlorite which is formed by such a chlorination separates out in the form of only very fine crystals and that, as a result, the separation of the solid chlorination product from the mother liquor which is rich in calcium chloride, offers on the large scale almost insuperable difficulties. As a result, it has actually become the practice to make, instead of neutral calcium hypochlorite, the less valuable but more easily filtered basic calcium hypochlorite and to place these upon the market.

It has now been found in a most surprising manner, that neutral calcium hypochlorite can be obtained in a form which is capable of being satisfactorily filtered if the starting material is chlorinated in the presence of substantially larger quantities of liquid than have hitherto been used; these quantities of liquid are to be adjusted so that, at the completion of the chlorination, the final ratio by weight between the separated solid calcium hypochlorite and the liquid phase amounts to at least 1:6, and preferably has a higher ratio, between 1:10 and 1:20. If operations are carried out in this way a calcium hypochlorite is obtained which is more coarsely granular and which can be satisfactorily separated and extensively washed from the mother liquor by means of filter presses, suction methods, rotary filters, centrifuges and the like.

A still more coarse granulation and therefore a still better filtering capability of the neutral calcium hypochlorite can be produced if at the same time care is taken that the calcium chloride concentration of the liquid phase does not exceed 300 g. per litre at the end of the chlorination.

In this way the still further advantage is secured that a calcium hyphochlorite which is very poor in calcium chloride can be obtained directly and without employment of any special expedients, the said hypochlorite possessing a particularly good stability.

The proportion between the solid phase and the liquid set forth above is preferably adjusted by adding to the calcium hydroxide or the basic hypochlorites before the chlorination thereof a suitable quantity of mother liquor from a previous operation, preferably together with water in a quantity such that the final concentration of 300 g. per litre is not exceeded by the calcium chloride which is formed during the chlorination.

In this way yields of solid calcium hypochlorite are produced as a result of the chlorination which, in spite of the considerable increase in the liquid phase, are in no way inferior to the yields obtained in the processes heretofore known.

Finally it has been found advantageous to carry out the chlorination at the lowest possible temperature, for example between 25° and 15° C. in order to promote the formation of larger crystals.

More particularly the final temperature, which ought preferably to amount to about 15° should not exceed 30° since otherwise there is the danger of comparatively small crystals separating out.

The following comparative experiments indicate the advantageous effect on the particle size and the filtering capability of the calcium hypochlorite which separates during the chlorination of the expedients provided by this invention:

1. If a suspension of lime consisting of 2000 g. of calcium hydroxide and 2550 g. of water are treated with chlorine whilst being stirred at a temperature falling from 34° to 27° C. than at the completion of the chlorination a stiff mass is obtained in which the ratio of the solid phase to the mother liquor is 1:2.3. A separation of the extremely finely crystalline calcium hypochlorite from the mother liquor, containing about 447 g. of calcium chloride per litre, is practically out of the question on a technical scale.

Microscopic investigations have shown that the solid calcium hypochlorite here consists of small needles having a length of about 10 microns and a thickness of 1–2 microns; the average practical volume amounts to about 23 cubic microns.

2. If, on the other hand, a lime suspension consisting of 2,000 g. of calcium hydroxide and 2,460 g. of water are diluted prior to the chlorination with 28,100 g. of the mother liquor from a previous operation containing about 72 g. of calcium hypochlorite and 497 g. of calcium chloride per litre, then, at the completion of the chlorination a thin suspension is obtained in which the proportion of solid phase to mother liquor amounts to about 1:14. The solid calcium hypochlorite can be readily separated by filtration or the like from the mother liquor which again contains 497 g. of calcium chloride and 72 g. of calcium hypochlorite per litre.

Microscopic investigation shows that the chlorination product consists of roundish individual particles having a diameter of about 10–20 microns and possessing an average volume of about 1700 cubic microns.

3. If finally a lime suspension consisting of 2,000 g. of calcium hydroxide and 5,340 g. of water are diluted prior to the chlorination with 10,450 g. of mother liquor from the previous operation (containing 120 g. of calcium hypochlorite and 250 g. of calcium chloride per litre), then at the completion of the chlorination a thin mash is obtained in which the ratio between the solid phase and the mother liquor is 1:13.

The mother liquor, readily separated from the crystals, again has approximately the same composition as the starting liquor. Microscopic investigation shows that the solid calcium hypochlorite consists of roundish individual particles of about 20–40 microns diameter and having an average volume of 14,000 cubic microns.

The satisfactory filtering capability of the calcium hypochlorite obtained in accordance with this invention enables the washing on the filtering apparatus to be carried out more thoroughly than was hitherto possible. As a consequence, products are obtained having a higher active chlorine content and which are characterized by particular stability since the calcium chloride, which diminishes the stability, can be thoroughly removed.

The washing is most advantageously effected by covering with a liquor which is poor in calcium chloride and saturated with respect to neutral hypochlorite.

Whereas when working according to the methods hitherto known, employing stiff mashes, the chlorine always had to be introduced under a certain excess pressure, with the diluted suspensions which are to be employed in accordance with the present invention, operations can be carried out without pressure, so that danger of possible superchlorination is diminished.

One preferred method of carrying out the invention is described in the following example:

In this method of working a particularly good yield of solid calcium hypochlorite is obtained by the wellnigh complete recovery of the calcium hypochlorite dissolved in the mother liquor.

In order to secure this result, for example 14.7 kg. of calcium hydroxide are mashed with the whole of the mother liquor (156 kg., containing 230 g. of calcium chloride per litre and saturated with respect to calcium hypochlorite) resulting from the previous operation). By interaction between the calcium hydroxide and the calcium hypochlorite dissolved in the mother liquor, difficultly soluble basic calcium hypochlorite is formed in the solid phase. From the mother liquor, the calcium hypochlorite content of which has been diminished by the said interaction, 42 kg. are drawn off and before, during or at the end of the chlorination (with about 12.7 kg. of chlorine) replaced by addition of 38 kg. of water.

The chlorination is carried out whilst moderately stirring and cooling at a temperature of 25–15° C. and is completed as soon as the alkalinity of the mash has reached 2–6 g. of calcium hydroxide per litre. The solid phase, consisting of approximately neutral calcium hypochlorite is separated from the mother liquor by means of a rotary filter and is washed on the filter with a saturated hypochlorite solution or, if necessary, with water. The mother liquor, which again contains 230 g. of calcium chloride per litre and is saturated with respect to hypochlorite, is once again mashed up with calcium hydroxide and so returned into the process. The washing liquors also may be re-utilized in subsequent operations as diluting water.

The procedure may also be such that the calcium hydroxide is mashed up with the whole or a portion of the additional water and only then is the mother liquor added and, after the conversion of the dissolved calcium hypochlorite into basic calcium hypochlorite which now takes place, mother liquor is removed in a quantity such that the calcium chloride concentration after the completion of the chlorination corresponds to the initial concentration of this liquor.

The method described yields calcium hypochlorite preparations which, after drying, contain 80–85% of active chlorine and are satisfactorily stable.

The invention is not limited to the methods of chlorinating calcium hydroxide or basic hypochlorites which are set forth in the specification. It can be employed in every case where the chlorination of these starting substances, whether this be effected discontinuously or continuously, is effected in the presence of solutions containing calcium chloride.

What we claim is:—

1. A method of making readily filterable neutral calcium hypochlorite consisting in chlorinating calcium hydroxide or basic calcium hypochlorite in presence of solutions containing calcium chloride, the final ratio between the weight of the solid chlorination product and that of the liquid phase being maintained at 1: at least 6 and the calcium chloride content of the liquid phase at the end of the chlorination being less than 300 gms./litre, and directly separating off the solid chlorination product.

2. A method of making readily filterable neutral calcium hypochlorite consisting in chlorinating calcium hydroxide or basic calcium hypochlorite in the presence of solutions containing calcium chloride, the final ratio between the weight of the solid chlorination product and that of the liquid phase being maintained at between 1:10 and 1:20, and the calcium chloride content of the liquid phase at the end of the chlorination being less than 300 gms./litre, and directly separating off the solid chlorination products.

3. A method of making neutral calcium hypochlorite consisting in chlorinating calcium hydroxide or basic calcium hypochlorite at a temperature below 25° C. in presence of solutions containing calcium chloride, the final ratio between the weight of the solid chlorination product and that of the liquid phase being maintained at 1: at least 6 and the calcium chloride content of the liquid phase at the end of the chlorination being less than 300 gms./litre, and directly separating off the solid chlorination product.

4. A method of making readily filterable calcium hypochlorite consisting in chlorinating calcium hydroxide or basic calcium hypochlorite in presence of solution containing calcium chloride, the final ratio between the weight of the solid chlorination product and that of the liquid phase being maintained at at least 1:6 and further characterized by the step of adding mother liquor from a previous preparation to the liquor to be chlorinated together with water in a quantity such that a final content of 300 gms./litre is not exceeded by the calcium chloride after the chlorination.

5. A method of making readily filterable neutral calcium hypochlorite consisting in chlorinating calcium hydroxide or basic calcium hypochlorite in presence of solutions containing calcium chloride, the final ratio between the weight of the solid chlorination product and that of the liquid phase being maintained at 1: at least 6, separating off the solid chlorination product, mixing calcium hydroxide with the separated liquid phase, allowing the basic calcium hypochlorite which forms to settle, withdrawing a portion of the mother liquor and adding water and then chlorinating, the quantity of water added being such that at the end of the chlorination a mother liquor results having the same calcium chloride concentration as the said separated liquid phase and can be used for the same, and separating off the solid chlorination product.

6. A method of making readily filterable neutral calcium hypochlorite consisting in chlorinating calcium hydroxide or basic calcium hypochlorite in presence of solutions containing calcium chloride, the final ratio between the weight of the solid chlorination product and that of the liquid phase being maintained at 1: at least 6, separating off the solid chlorination product, adding the separated liquid phase to a mixture of water and calcium hydroxide so as to form a mash, allowing the basic calcium hypochlorite which forms to settle, withdrawing a portion of the mother liquor and adding water and chlorinating, the total quantity of water added being such that at the end of the chlorination a mother liquor results having the same calcium chloride concentration as the said separated liquid phase and can be used for the same, and separating off the solid chlorination product.

7. A method of making readily filterable neutral calcium hypochlorite consisting in chlorinating calcium hydroxide or basic calcium hypochlorite in presence of solutions containing calcium chloride, the final ratio between the weight of the solid chlorination product and that of the liquid phase being maintained at 1: at least 6, separating off the solid chlorination product, mixing calcium hydroxide with the separated liquid phase, allowing the basic calcium hypochlorite which forms to settle, withdrawing a portion of the mother liquor and adding water and then chlorinating, the total quantity of water mixed with the calcium hydroxide being such that at the end of the chlorination a mother liquor results having the same calcium chloride concentration as the said separated liquid phase and can be used for the same, and separating off the solid chlorination product.

HEINRICH KLOPSTOCK.
ALFRED WURBS.